July 20, 1954

H. E. SORG 2,684,452

ELECTRON TUBE

Filed July 28, 1952

INVENTOR.

BY Harold E Sorg

Patented July 20, 1954

2,684,452

UNITED STATES PATENT OFFICE 2,684,452

ELECTRON TUBE

Harold E. Sorg, Redwood City, Calif., assignor to Eitel-McCullough, Inc., San Bruno, Calif., a corporation of California Application July 28, 1952, Serial No. 301,187

6 Claims. (Cl. 315—5)

My invention relates to an improved tube of the reflex klystron type.

It is among the objects of my invention to provide a tube of the character described which is compact, rugged and has a good frequency stability.

Another object is to provide such a tube in which the cavity resonator comprises metalized ceramic parts.

Still another object is to provide a tube embodying ceramics in the envelope construction and having improved cathode and repeller electrode structures.

The invention possesses other objects and features of advantage, some of which with the foregoing, will be set forth in the following description of my invention. It is to be understood that I do not limit myself to this disclosure of species of my invention as I may adopt variant embodiments thereof within the scope of the claims.

Referring to the drawing.

Figure 1:
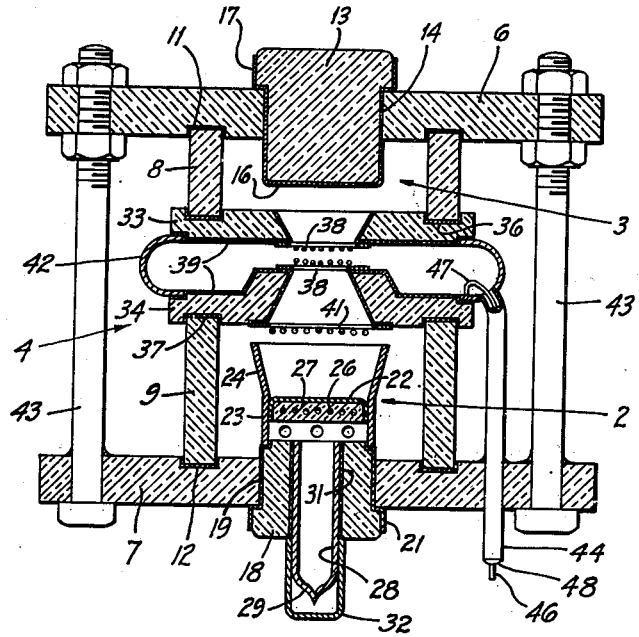
Figure 1 is an axial sectional view of tube.
Figure 2:
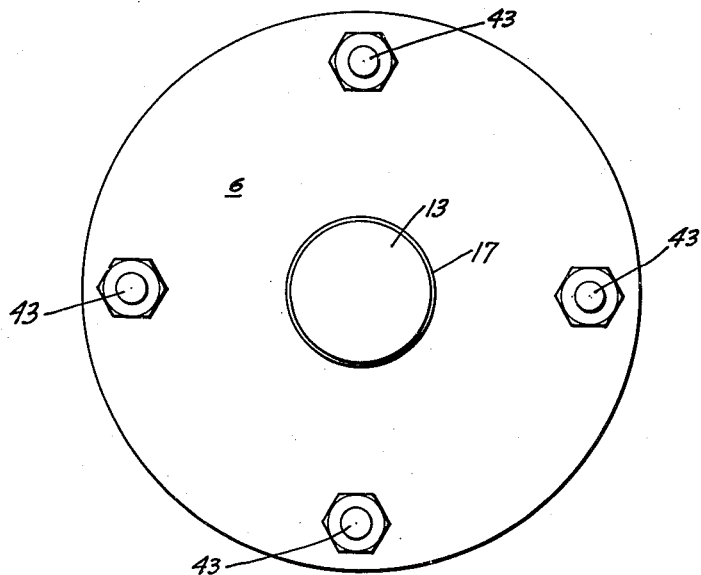
Figure 2 is a top view of the same.

In greater detail, my reflex klystron comprises a generally cylindrical envelope having a cathode 2 at one end, a repeller electrode 3 at the other end, and a cavity resonator 4 intermediate the cathode and repeller electrode. As shown in the drawing, the tube is considerably enlarged for convenience of illustration. An actual tube operating at around 10,000 megacycles would be about 2" in diameter. The evacuated envelope comprises upper and lower end wall plates 6 and 7 of ceramic and cylindrical side wall sections 8 and 9 also of ceramic. The end walls are preferably recessed to receive the side wall cylinders at the joints 11 and 12, these interfitting joints being useful to establish alignment when assembling the tubes.

The ceramic used in making up the envelope parts may be of any suitable ceramic-like material such as the alumina or zircon type ceramic bodies. I have had good success with the alumina body because it is easy to metalize and has good mechanical strength and thermal resistance properties. The ceramic-to-ceramic joints 11 and 12 may be made in several ways using known metalizing and brazing techniques. For example, the ceramic pieces may be coated with finely divided metal powder and fired to sinter the metal particles to the ceramic. A satisfactory procedure is to coat with a mixture of molybdenum and manganese powders and fire in hydrogen to a temperature of about 1350° C. This produces a thin metallic layer firmly bonded to the ceramic. The sintered area is then preferably electroplated with metal such as nickel to produce a solid metal surface. Another metalizing technique is to paint titanium or zirconium hydride powders on the ceramic and fire in vacuum to about 1200° C.

The metalized ceramics may then be brazed or soldered together with silver solder or brazing alloys such as silver-copper, gold-copper or the like. The brazes are readily made by fitting the ceramic envelope sections together with rings of wire solder adjacent the joints and then elevating the temperature of the whole up to the melting point of the solder in a suitable brazing furnace. The solder or brazing alloy flows between the metalized ceramic surfaces at the joint and produces a seal which is vacuum-tight and strong mechanically.

Repeller electrode 3 is formed as part of a ceramic stem piece 13 which is in the shape of a cylindrical plug extending through the end wall 6. The stem is metalized and brazed to the metalized aperture in the end wall at the joint 14. The active surface of the repeller electrode is formed by the metalized inner face 16 of the stem and the terminal 17 for the repeller is formed by a metalized area on the outer cylindrical surface of the stem, the brazed joint 14 functioning as a lead-in conductor for the repeller electrode. This provides an extremely simple and effective electrode structure.

Cathode 2 is also mounted on a plug-like ceramic stem 18 having a brazed joint 19 serving as the lead-in conductor and having a metalized outer surface providing the cathode terminal 21. The cathode comprises a metal cup 22 of metal such as nickel coated on the upper surface with an electron emissive material such as the conventional barium-strontium oxides. This cathode cup is fitted in a metal sleeve 23 which in turn is brazed to the metalized end of ceramic stem 18, the sleeve 23 preferably having an upwardly extending flared skirt 24 to provide the focusing electrode of the cathode structure. The heater 26 for the cathode comprises a flat spiral of heater wire embedded in a suitable insulating material 27. One end of the heater coil is connected to the cathode sleeve and the other end is brought out to a separate terminal.

In the tube illustrated a metal exhaust tubulation 28 extends downwardly through the cathode stem 18, which tubulation is pinched off at tip 29 after evacuation of the envelope. This tubulation is fitted in a central hole in the ceramic stem having a metalized inner surface and is secured by braze 31 to such surface. Tubulation 28 also functions as a lead-in conductor for one end of the cathode heater. A metal cap 32 over the tubulation provides a button-like terminal.

Cavity resonator 4 is formed by a pair of disk-shaped ceramic walls 33 and 34 recessed to receive the ceramic wall cylinders 8 and 9 brazed thereto at the joints 36 and 37. These ceramic walls of the resonator have central apertures for passage of the electron beam from the cathode to the repeller electrode, the usual resonator grids 38 being provided over these apertures. Those surfaces of the ceramic resonator walls which are to be electrically conductive, such as the opposed inner surfaces, are made so by metalizing the surfaces as indicated at 39. An accelerator grid 41 carried on the underside of wall 34 is connected to the resonator by such metalized areas on the ceramic.

In a reflex klystron tube of this kind it is desirable to change the resonant frequency of the resonator so as to tune the tube over a band of frequencies. This is accomplished in my tube without sacrifice of ruggedness in the structure as a whole by the provision of a channel-like ring-shaped metal piece 42 forming the peripheral wall of the resonator. The edges of such wall section are brazed to the metalized edges of the ceramic wall disks 33 and 34, thus providing a continuation of the metal surfaces defining the interior of the resonator. This metal wall section also provides an external terminal for the resonator.

Metal wall 42 provides sufficient flexibility in the structure to permit some degree of relative movement between ceramic walls 33 and 34 for adjusting the operating frequency of the tube. The means for effecting such relative movement is connected between the ceramic end wall plates 6 and 7 of the tube and may be any suitable tuning device such as a series of studs 43 fixed to the lower plate and having nuts at the upper plate for making the adjustment. These studs are made of a metal having a thermal expansion characteristic similar to that of the ceramic material used in the envelope so that temperature fluctuations will not influence the operating frequency.

Radio frequency power is preferably taken from the resonator by a coaxial output line having an outer conductor 44 and an inner conductor 46 terminating in a coupling loop 47. This output line enters the cavity resonator through the metal wall 42 and is brazed thereto, the conductors being sealed together at the outer end as by a glass bead 48. The output line is preferably supported externally of the tube by extending through the ceramic end plate 7 and being brazed thereto.

My improved tube structure is extremely rigid mechanically and has very stable frequency characteristics. In other words, once the frequency is set it stays constant. The cathode and repeller electrode structures are also considerably simplified in my structure which further enhances the ruggedness of the device.

I claim:

1. An electron tube comprising a generally cylindrical envelope, a cathode at one end of the envelope and a repeller electrode at the other end, a cavity resonator having aligned apertures interposed between the cathode and repeller electrode, said resonator comprising a pair of disk-shaped walls of ceramic, the inner surfaces of the ceramic resonator walls being metalized, and a ring-shaped metal piece forming the peripheral wall of the resonator.

2. An electron tube comprising a generally cylindrical envelope having ceramic end walls, a ceramic stem extending through and supported by one of said walls, the inner end of said stem being metalized providing a repeller electrode, a metallic bond uniting the stem to its supporting wall, said metallic bond providing a lead-in conductor for the repeller electrode, a cathode in the envelope supported by the other end wall, a cavity resonator having aligned apertures interposed between the cathode and repeller electrode, and a side wall for the envelope comprising ceramic cylinders between the end walls and said cavity resonator.

3. An electron tube comprising a generally cylindrical envelope having ceramic end walls, a ceramic stem extending through and supported by one of said walls, a cathode mounted on the inner end of said stem, a metallic bond uniting the stem to its supporting wall, said metallic bond providing a lead-in conductor for the cathode, a repeller electrode in the envelope supported by the other end wall, a cavity resonator having aligned apertures interposed between the cathode and repeller electrode, and a side wall for the envelope comprising ceramic cylinders between the end walls and said cavity resonator.

4. An electron tube comprising a generally cylindrical envelope having ceramic end walls, a ceramic stem extending through and supported by one of said walls, the inner end of said stem being metalized providing a repeller electrode, a metallic bond uniting the stem to its supporting wall, said metallic bond providing a lead-in conductor for the repeller electrode, a second ceramic stem extending through and supported by the other end wall, a cathode mounted on the inner end of the last mentioned stem, a metallic bond uniting the second stem to its supporting wall, said last mentioned metallic bond providing a lead-in conductor for the cathode, a cavity resonator having aligned apertures interposed between the cathode and repeller electrode, and a side wall for the envelope comprising ceramic cylinders between the end walls and said cavity resonator.

5. An electron tube comprising a generally cylindrical envelope having ceramic end walls, a ceramic stem extending through and supported by one of said walls, a cathode mounted on the inner end of said stem, a metallic bond uniting the stem to its supporting wall, said metallic bond providing a lead-in conductor for the cathode, a heater for the cathode, a metal exhaust tubulation extending through said stem, said tubulation providing a lead-in conductor for the heater, a repeller electrode in the envelope supported by the other end wall, a cavity resonator having aligned apertures interposed between the cathode and repeller electrode, and a side wall for the envelope comprising ceramic cylinders between the end walls and said cavity resonator.

6. An electron tube comprising a generally cylindrical envelope having ceramic end walls, a cathode in the envelope supported by one of the end walls, a repeller electrode in the envelope supported by the other end wall, a cavity resonator having aligned apertures interposed between the cathode and repeller electrode, said resonator comprising a pair of disk-shaped walls of ceramic, the inner surfaces of the ceramic resonator walls being metalized, and a side wall for the envelope comprising ceramic cylinders between the ceramic end walls and said ceramic walls of the cavity resonator.

References Cited in the file of this patent

UNITED STATES PATENTS

| Number | Name | Date |
| --- | --- | --- |
| 2,099,531 | Passarge | Nov. 16, 1937 |
| 2,128,234 | Dallenbach | Aug. 30, 1938 |
| 2,226,653 | Allerding et al. | Dec. 31, 1940 |
| 2,343,487 | Steudel | Mar. 7, 1944 |
| 2,351,895 | Allerding | June 20, 1944 |
| 2,452,075 | Smith | Oct. 26, 1948 |